(12) United States Patent
Sakaue

(10) Patent No.: US 8,321,103 B2
(45) Date of Patent: Nov. 27, 2012

(54) TRANSMISSION CONTROL SYSTEM AND VEHICLE

(75) Inventor: Masaya Sakaue, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 748 days.

(21) Appl. No.: 12/551,644

(22) Filed: Sep. 1, 2009

(65) Prior Publication Data

US 2010/0063695 A1    Mar. 11, 2010

(30) Foreign Application Priority Data

Sep. 5, 2008    (JP) .................................. 2008-227812

(51) Int. Cl.
*G06F 19/00*    (2011.01)
(52) U.S. Cl. ................ 701/54; 701/22; 701/51; 701/58; 701/59; 701/102
(58) Field of Classification Search .................. 701/22, 701/51, 54, 58, 59, 102, 103, 105; 475/21, 475/189, 204, 207, 214, 215; 477/3, 5, 37, 477/50, 86, 107, 115
See application file for complete search history.

(56) References Cited

U.S. PATENT DOCUMENTS

| | | | | |
|---|---|---|---|---|
| 6,406,403 B1* | 6/2002 | Steeby | ......................... | 477/109 |
| 7,367,917 B2* | 5/2008 | Sakamoto et al. | ................ | 477/5 |
| 8,140,205 B2* | 3/2012 | Hanyu et al. | ..................... | 701/22 |
| 2002/0082137 A1* | 6/2002 | Steeby | ......................... | 477/109 |
| 2004/0230360 A1* | 11/2004 | Matsumura et al. | ............ | 701/51 |
| 2006/0016282 A1 | 1/2006 | Berger et al. | | |
| 2006/0234827 A1* | 10/2006 | Sakamoto et al. | ............... | 477/30 |
| 2008/0227591 A1* | 9/2008 | Imamura et al. | ................... | 477/3 |
| 2008/0306643 A1* | 12/2008 | Hanyu et al. | ..................... | 701/22 |
| 2009/0248265 A1* | 10/2009 | Tabata et al. | .................... | 701/59 |
| 2010/0151988 A1* | 6/2010 | Tabata et al. | ..................... | 477/3 |

FOREIGN PATENT DOCUMENTS

| | | |
|---|---|---|
| DE | 103 32 668 A1 | 2/2005 |
| DE | 10 2004 029 076 A1 | 2/2006 |
| JP | 07-054878 A | 2/1995 |
| JP | 11-247893 A | 9/1999 |
| JP | 2003-118432 A | 4/2003 |
| JP | 2003-166564 A | 6/2003 |
| JP | 2004-084912 A | 3/2004 |
| JP | 2004-270624 A | 9/2004 |
| JP | 2006-083946 A | 3/2006 |
| WO | 03/033290 A1 | 4/2003 |

OTHER PUBLICATIONS

Official Communication issued in corresponding European Patent Application No. 09011234.3, mailed on Jan. 19, 2012.

* cited by examiner

*Primary Examiner* — Dalena Tran
*Assistant Examiner* — Jonathan L Sample
(74) *Attorney, Agent, or Firm* — Keating & Bennett, LLP

(57) ABSTRACT

In a transmission control system for a vehicle, in a torque return period at the time of up-shifting of a transmission, an engine torque and a clutch torque are increased in parallel. A target engine torque value and a target clutch torque value are set such that the clutch torque changes at a value higher than the engine torque. The target clutch torque value is set such that a difference between an amount of energy generated in a clutch and an amount of energy generated in an engine substantially coincides with an amount of energy required to reduce the rotation speed of the engine to a target rotation speed.

10 Claims, 9 Drawing Sheets

TRANSMISSION CONTROL SYSTEM AND VEHICLE

BACKGROUND OF THE INVENTION

1. Field of the Invention

The present invention relates to a transmission control system and a vehicle including the same.

2. Description of the Background Art

Transmission control systems that automatically perform shift changes of transmissions have been conventionally developed.

In such transmission control systems, when the transmissions are shifted up, for example, outputs of engines are first decreased while clutches are disconnected. In such states, the transmissions are shifted up. Thereafter, the clutches are connected while the outputs of the engines are returned.

When the transmissions are shifted up, the rotation speeds of main shafts of the transmissions decrease. Therefore, transmission shocks may, in some cases, occur when the clutches are connected.

Therefore, in an automatic transmission device for a vehicle discussed in JP 7-54878 A, for example, a half-clutched state is maintained until a difference in rotation speed between an engine and a transmission is not more than a predetermined value or until a predetermined period of time has elapsed when a clutch is connected. This prevents a transmission shock from occurring when the clutch is connected.

In the automatic transmission device discussed in JP 7-54878 A, however, an output of the engine is returned after the half-clutched state is terminated. In this case, a period of time that has elapsed since a connection operation of the clutch was started until the return of the output of the engine is completed is increased. This causes a driving feeling of a vehicle to deteriorate.

SUMMARY OF THE INVENTION

In order to overcome the problems described above, preferred embodiments of the present invention provide a transmission control system that is capable of smoothly shifting up a transmission and a vehicle including the same.

According to a preferred embodiment of the present invention, a transmission control system for a vehicle including an engine, a clutch, and a transmission includes an engine torque adjuster arranged to adjust an engine torque generated in the engine, a clutch operating mechanism arranged to disconnect and connect the clutch, a shifting mechanism arranged to shift the gear position of the transmission, and a controller arranged to control the engine torque adjuster, the clutch operating mechanism, and the shifting mechanism. When the transmission is shifted up, the controller calculates a target rotation speed of the engine after the up-shifting of the transmission while calculating a first amount of energy required to reduce a rotation speed of the engine to the target rotation speed, causes the engine torque adjuster to decrease the engine torque while causing the clutch operating mechanism to disconnect the clutch, and causes the shifting mechanism to shift the gear position of the transmission with the clutch disconnected. Furthermore, after the gear position is shifted, the controller causes the engine torque adjuster to increase the engine torque according to a target engine torque value set as a value that changes in a predetermined torque adjustment period while causing the clutch operating mechanism to connect the clutch such that an engagement torque of the clutch increases according to a target clutch engagement torque value set as a value that changes in the torque adjustment period. In the torque adjustment period, the target clutch engagement torque value is set such that a difference between a second amount of energy generated in the clutch when the engagement torque of the clutch is generated according to the target clutch engagement torque value and a third amount of energy generated in the engine when the engine torque is generated according to the target engine torque value is substantially equal to the first amount of energy.

In the transmission control system, when the transmission is shifted up, the engine torque is decreased while the clutch is disconnected. The gear position of the transmission is shifted with the clutch disconnected.

In the torque adjustment period after the gear shifting of the transmission, the clutch is connected such that the engine torque is increased according to the target engine torque value while the engagement torque of the clutch increases according to the target clutch engagement torque value. This results in completion of the up-shifting of the transmission.

Here, in the transmission control system, the engine torque can be increased in parallel with the connection operation of the clutch in the torque adjustment period, as described above. Therefore, a period of time required to return the engine torque can be shortened. This results in smooth up-shifting of the transmission.

In the transmission control system, the controller calculates the target rotation speed of the engine after the up-shifting of the transmission when the transmission is shifted up while calculating the first amount of energy for reducing the rotation speed of the engine to the target rotation speed. In the torque adjustment period, the target clutch engagement torque value is set such that the difference between the second amount of energy generated in the clutch when the engagement torque of the clutch is generated according to the target clutch engagement torque value and the third amount of energy generated in the engine when the engine torque is generated according to the target engine torque value is substantially equal to the first amount of energy.

In this case, the rotation speed of the engine can be reliably reduced to the target rotation speed in the torque adjustment period. This can prevent the period of time required to reduce the rotation speed of the engine to the target rotation speed from being increased. This can result in quick up-shifting of the transmission.

The target clutch engagement torque value may change at a value higher than the target engine torque value in a period of time that has elapsed after the start of the torque adjustment period before the end thereof. In this case, a sufficiently high torque can be applied to the drive wheel in the vehicle before the torque adjustment period is terminated. Thus, a period of time in which a driver has an idling feeling can be shortened. This results in improvement in a driving feeling of the vehicle.

The target engine torque value may change so as to increase to a value of the engine torque before the up-shifting of the transmission when the torque adjustment period is terminated.

In this case, in the torque adjustment period, the engine torque can be returned to the engine torque before the up-shifting. This enables the vehicle to be quickly accelerated when the up-shifting of the transmission is terminated. This results in sufficient improvement in the driving feeling of the vehicle.

The torque adjustment period may be determined based on a difference between a rotation speed of the engine before the up-shifting of the transmission and the target rotation speed. In this case, the torque adjustment period can be adjusted depending on a difference in the rotation speed of the engine before and after the up-shifting. This enables the rotation speed of the engine to smoothly decrease.

The torque adjustment period may be determined based on the gear position of the transmission. In this case, the torque adjustment period can be adjusted depending on the gear position of the transmission. This enables the rotation speed of the engine to smoothly decrease.

The target engine torque value and the target clutch engagement torque value may start to increase at a point in time when the torque adjustment period is started. The torque adjustment period may include a first period including a point in time when the increase is started and a second period longer than the first period. The target clutch engagement torque value may be set such that a difference between the target clutch engagement torque value and the target engine torque value increases with an elapse of time within the first period.

In this case, the engagement torque of the clutch and the engine torque can be increased at the point in time when the torque adjustment period is started. This enables quick up-shifting of the transmission.

In the first period, a difference between the engagement torque of the clutch and the engine torque increases with an elapse of time. Even when the increase of the engine torque is delayed, therefore, the engagement torque of the clutch can be early increased. This enables a sufficiently high torque to be quickly applied to the drive wheel in the vehicle while reducing a variation in the engine torque. As a result, it is possible to sufficiently shorten the period of time in which the driver has an idling feeling while preventing a shock based on the variation in the engine torque from occurring in the vehicle. Particularly at the time of up-shifting in rapid acceleration, the idling feeling can be further reduced while increasing the rise of the clutch torque.

The foregoing results in further improvement in the driving feeling of the vehicle.

The target clutch engagement torque value maybe set such that the difference between the target clutch engagement torque value and the target engine torque value decreases with an elapse of time within the second period.

In this case, the value of the engagement torque of the clutch can be gradually brought closer to the value of the engine torque. This can sufficiently prevent the shock from occurring in the vehicle when the clutch is connected.

The target clutch engagement torque value maybe set such that the difference between the target clutch engagement torque value and the target engine torque value is substantially constant in the second period.

In this case, the engagement torque of the clutch can be gently or gradually increased. This can sufficiently prevent the shock based on the variation in the engagement torque of the clutch from occurring in the vehicle.

The controller may carry out feedforward control of the clutch operating mechanism according to a control value previously set until the engagement of the clutch is started, while carrying out feedback control of the clutch operating mechanism based on a rate of decrease in the rotation speed of the engine or the engagement torque of the engine after the engagement of the clutch is started.

In this case, it is possible to quickly start the connection operation of the clutch by the feedforward control while performing a smooth connection operation of the clutch by the feedback control.

According to another preferred embodiment of the present invention, a vehicle includes a drive wheel, an engine, a transmission arranged to transmit a torque generated by the engine to the drive wheel, a clutch provided between the engine and the transmission, and a transmission control system. The transmission control system includes an engine torque adjuster arranged to adjust an engine torque generated in the engine, a clutch operating mechanism arranged to disconnect and connect the clutch, a shifting mechanism arranged to shift the gear position of the transmission, and a controller arranged to control the engine torque adjuster, the clutch operating mechanism, and the shifting mechanism. When the transmission is shifted up, the controller calculates a target rotation speed of the engine after the up-shifting of the transmission while calculating a first amount of energy required to reduce the rotation speed of the engine to the target rotation speed, causes the engine torque adjuster to decrease the engine torque while causing the clutch operating mechanism to disconnect the clutch, and causes the shifting mechanism to shift the gear position of the transmission with the clutch disconnected. Furthermore, after the gear position is shifted, the controller causes the engine torque adjuster to increase the engine torque according to a target engine torque value set as a value that changes in a predetermined torque adjustment period while causing the clutch operating mechanism to connect the clutch such that an engagement torque of the clutch increases according to a target clutch engagement torque value set as a value that changes in the torque adjustment period. In the torque adjustment period, the target clutch engagement torque value is set such that a difference between a second amount of energy generated in the clutch when the engagement torque of the clutch is generated according to the target clutch engagement torque value and a third amount of energy generated in the engine when the engine torque is generated according to the target engine torque value is substantially equal to the first amount of energy.

In the vehicle, the torque generated by the engine is transmitted to the drive wheel through the clutch and the transmission.

Here, the vehicle is provided with the transmission control system. In the transmission control system, when the transmission is shifted up, the engine torque is decreased while the clutch is disconnected. The gear position of the transmission is shifted with the clutch disconnected.

In the torque adjustment period after the gear shifting of the transmission, the clutch is connected such that the engine torque is increased according to the target engine torque value while the engagement torque of the clutch increases according to the target clutch engagement torque value. This results in completion of the up-shifting of the transmission.

Here, in the transmission control system, the engine torque can be increased in parallel with the connection operation of the clutch in the torque adjustment period, as described above. Thus, a period of time required to return the engine torque can be shortened. This can result in smooth up-shifting of the transmission.

In the transmission control system, the controller calculates the target rotation speed of the engine after the up-shifting of the transmission when the transmission is shifted up while calculating the first amount of energy required to reduce the rotation speed of the engine to the target rotation speed. The target clutch engagement torque value is set such that the difference between the second amount of energy generated in the clutch when the engagement torque of the clutch is generated according to the target clutch engagement torque value and the third amount of energy generated in the engine when the engine torque is generated according to the target engine torque value is substantially equal to the first amount of energy.

In this case, the rotation speed of the engine can be reliably reduced to the target rotation speed in the torque adjustment period. This can prevent the period of time required to reduce the rotation speed of the engine to the target rotation speed from being increased. This can result in quick up-shifting of the transmission.

Other features, elements, steps, characteristics, and advantages of the present invention will become more apparent from the following description of preferred embodiments of the present invention with reference to the attached drawings.

DETAILED DESCRIPTION OF THE PREFERRED EMBODIMENTS

A vehicle including a transmission control system according to preferred embodiments of the present invention will now be described with reference to the drawings. A motorcycle will be described below as an example of the vehicle.

(1) Schematic Configuration of Motorcycle

Figure 1:
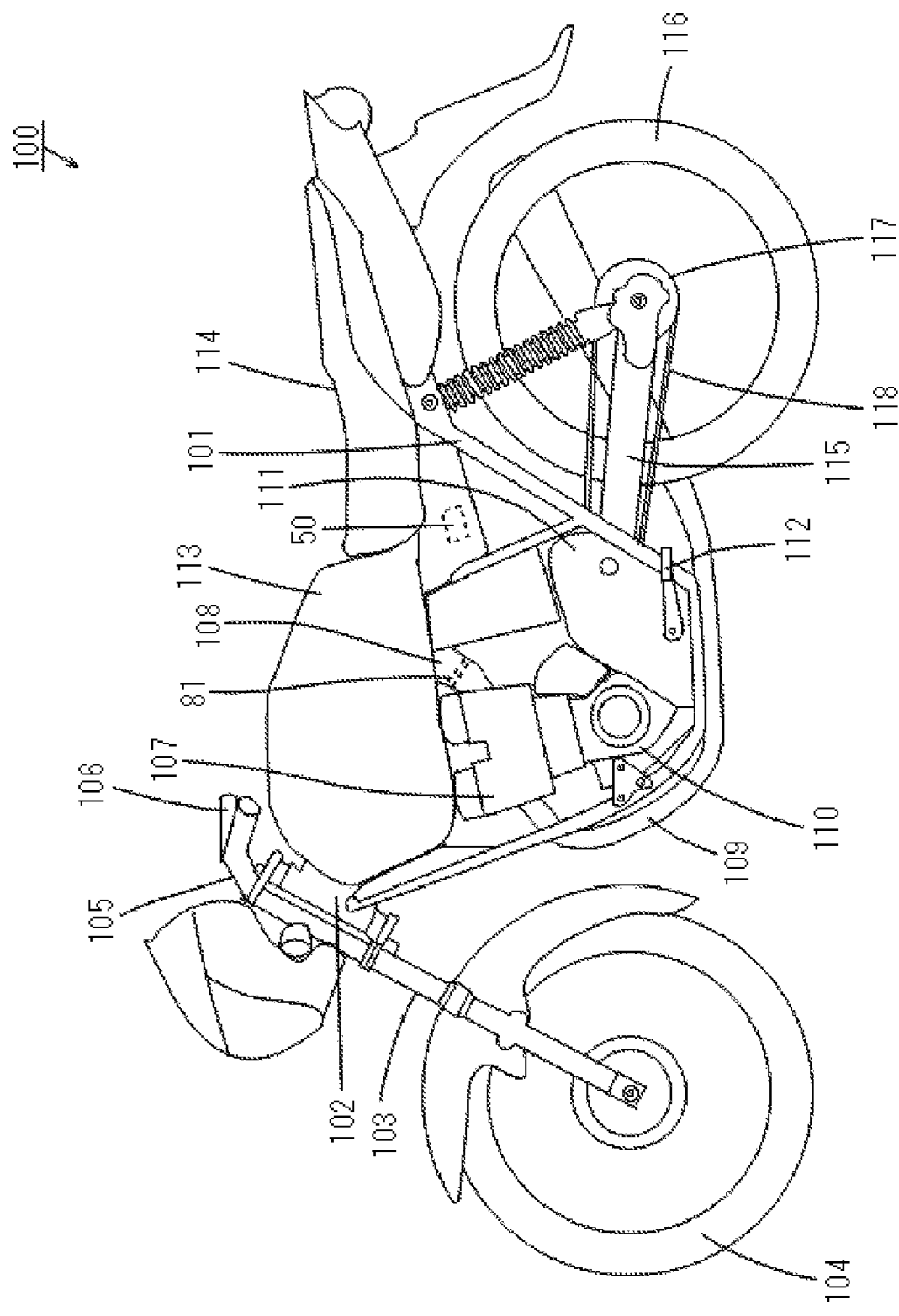
FIG. 1 is a schematic side view showing a motorcycle.

FIG. 1 is a schematic side view showing a motorcycle according to the present preferred embodiment.

In the motorcycle 100 shown in FIG. 1, a head pipe 102 is provided at a front end of a main body frame 101. A front fork 103 is rotatably provided at the head pipe 102. A front wheel 104 is rotatably supported at a lower end of the front fork 103. A handle 105 is provided at an upper end of the head pipe 102.

The handle 105 is provided with an accelerator grip 106. An engine 107 is provided at the center of the main body frame 101. A throttle body 108 is attached to an intake port of the engine 107, and an exhaust pipe 109 is attached to an exhaust port of the engine 107. The throttle body 108 is provided with a throttle valve 81.

A crankcase 110 is attached to a lower portion of the engine 107. A crank 2 (see FIG. 2) of the engine 107 is accommodated in the crankcase 110.

A transmission case 111 is provided at a lower portion of the main body frame 101. A transmission 5 (see FIG. 2) and a shifting mechanism 6 (see FIG. 2), described later, are provided within the transmission case 111. The transmission case 111 is provided with a shift pedal 112.

Note that in the present preferred embodiment, an operation for disconnecting a clutch 3 (see FIG. 2) by a driver is not required when the gear position of the transmission 5 is switched. That is, the motorcycle 100 according to the present preferred embodiment preferably includes a semi-automatic transmission control system that automatically switches the gear position of the transmission 5 based on a shifting operation by the driver. The details of the transmission control system will be described later.

A fuel tank 113 is provided above the engine 107, and a seat 114 is provided at the rear of the fuel tank 113. An ECU (Electronic Control Unit) 50 is provided below the seat 114. A rear arm 115 is connected to the main body frame 101 so as to extend toward the rear of the engine 107. The rear arm 115 rotatably holds a rear wheel 116 and a rear wheel driven sprocket 117. A chain 118 is attached to the rear wheel driven sprocket 117.

(2) Structures of Transmission and Shifting Mechanism

The transmission and the shifting mechanism provided in the transmission case 111 shown in FIG. 1 will be then described.

Figure 2:
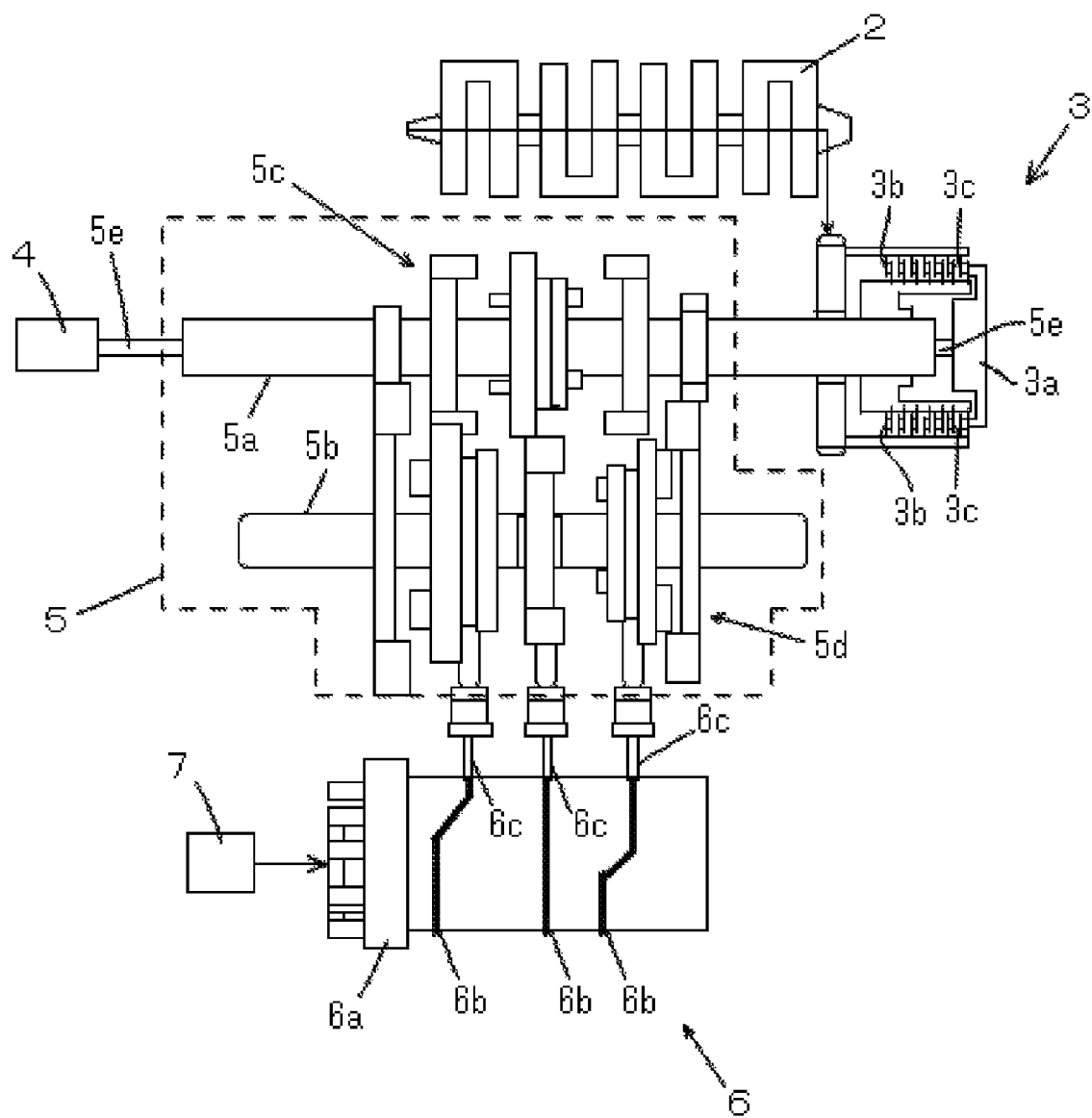
FIG. 2 is a diagram showing the structures of a transmission and a shifting mechanism.

FIG. 2 is a diagram showing the structures of the transmission and the shifting mechanism.

As shown in FIG. 2, the transmission 5 includes a main shaft 5a and a drive shaft 5b. A multi-stage (e.g., six-stage) transmission gear 5c is mounted on the main shaft 5a, and a multi-stage transmission gear 5d is mounted on the drive shaft 5b.

The main shaft 5a is connected to the crank 2 in the engine 107 (FIG. 1) through the clutch 3. The clutch 3 includes a pressure plate 3a, a plurality of clutch disks 3b, and a plurality of friction disks 3c. The clutch disks 3b are rotated by a torque transmitted from the crank 2. Furthermore, the friction disks 3c are connected to the main shaft 5a, to rotate with the main shaft 5a used as a rotation axis.

The friction disks 3c are urged in such a direction as to respectively adhere to the clutch disks 3b by the pressure plate 3a. Hereinafter, a state where the plurality of clutch disks 3b and the plurality of friction disks 3c adhere to each other is referred to as a connected (engaged) state of the clutch 3, and a state where the plurality of clutch disks 3b and the plurality of friction disks 3c are spaced apart from each other is referred to as a disconnected state of the clutch 3. A torque of the crank 2 is transmitted to the main shaft 5a through the clutch disks 3b and the friction disks 3c in the connected state of the clutch 3, while not being transmitted to the main shaft 5a in the disconnected state of the clutch 3.

A push rod 5e is inserted into the main shaft 5a. One end of the push rod 5e is connected to the pressure plate 3a, and the other end thereof is connected to an electric or hydraulic clutch actuator 4.

In the present preferred embodiment, when the clutch actuator 4 is driven under control of the ECU 50, the push rod 5e is extruded toward the clutch 3. Thus, the pressure plate 3a is pushed, so that the clutch disks 3b and the friction disks 3c are separated from each other. As a result, the clutch 3 enters the disconnected state. The details of a control operation of the ECU 50 will be described later.

A torque transmitted to the main shaft 5a from the crank 2 when the clutch 3 is in the connected state is transmitted to the drive shaft 5b through the transmission gear 5c and the transmission gear 5d. The chain 118 (FIG. 1) is attached to the drive shaft 5b. A torque of the drive shaft 5b is transmitted to the rear wheel 116 (FIG. 1) through the chain 118 and the rear wheel driven sprocket 117 (FIG. 1). Thus, the motorcycle 100 is driven.

A reduction gear ratio between the main shaft 5a and the drive shaft 5b is determined by a combination of the transmission gear 5c and the transmission gear 5d. Furthermore, the reduction gear ratio between the main shaft 5a and the drive shaft 5b is changed by moving any of multiple stages of the transmission gear 5c, 5d. Note that in the present preferred embodiment, the transmission gears 5c and 5d are connected to each other by a dog mechanism.

The transmission gears 5c and 5d are moved by the shifting mechanism 6. The shifting mechanism 6 has a shift cam 6a. A plurality of (for example, three in FIG. 2) cam grooves 6b are formed in the shift cam 6a. Shift forks 6c are respectively mounted on the cam grooves 6b. The shift cam 6a is connected to an electric or hydraulic shift actuator 7 through a link mechanism (not shown)

In the present preferred embodiment, when the shift actuator 7 is driven under control of the ECU 50, the shift cam 6a is rotated. This causes the shift forks 6c to respectively move along the cam grooves 6b. As a result, any of the multiple stages of the transmission gear 5c, 5d is moved, so that the gear position of the transmission 5 is changed.

(3) Transmission Control System

A transmission control system 200 for the motorcycle 100 will be then described.

Figure 3:
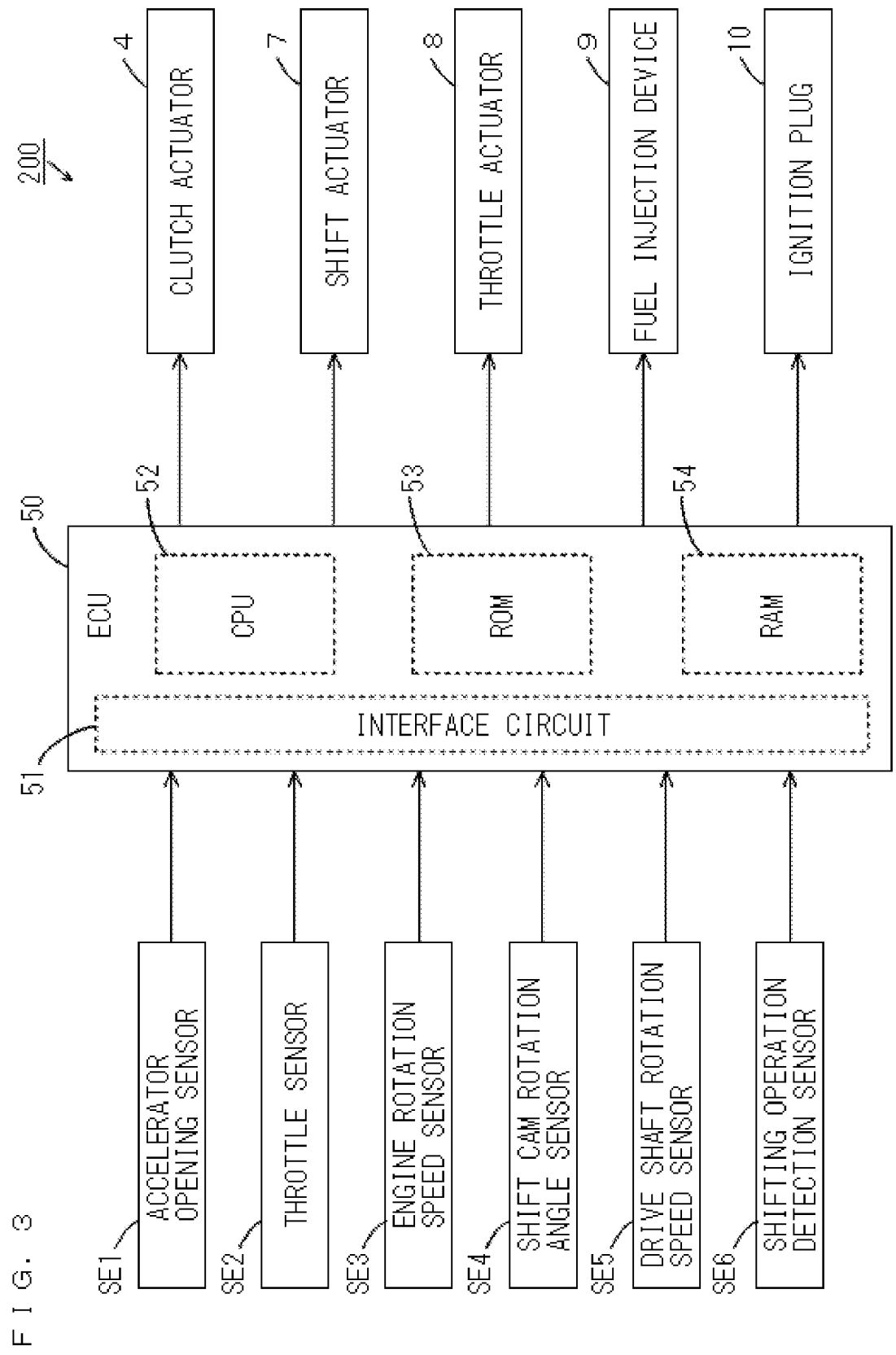
FIG. 3 is a block diagram showing the configuration of a transmission control system.

FIG. 3 is a block diagram showing the configuration of the transmission control system 200 according to the present preferred embodiment.

As shown in FIG. 3, the transmission control system 200 according to the present preferred embodiment preferably includes an accelerator opening sensor SE1, a throttle sensor SE2, an engine rotation speed sensor SE3, a shift cam rotation angle sensor SE4, a drive shaft rotation speed sensor SE5, a shifting operation detection sensor SE6, an ECU 50, a clutch actuator 4, a shift actuator 7, a throttle actuator 8, a plurality of fuel injection devices 9, and a plurality of ignition plugs 10.

The accelerator opening sensor SE1 detects an operation amount of the accelerator grip 106 (FIG. 1) by the driver (hereinafter referred to as an "accelerator opening") while giving the detected accelerator opening to the ECU 50. The throttle sensor SE2 detects an opening of the throttle valve 81 (FIG. 1) (hereinafter referred to as a "throttle opening") while giving the detected throttle opening to the ECU 50. The engine rotation speed sensor SE3 detects a rotation speed of the engine 107 (FIG. 1) while giving the detected rotation speed to the ECU 50. Note that in the present preferred embodiment, the engine rotation speed sensor SE3 preferably detects the angular velocity of the crank 2 (FIG. 2), to detect the rotation speed of the engine 107.

The shift cam rotation angle sensor SE4 detects the rotation angle of the shift cam 6a (FIG. 2) while giving the detected rotation angle to the ECU 50. The drive shaft rotation speed sensor SE5 detects a rotation speed of the drive shaft 5b (FIG. 2) while giving the detected rotation speed to the ECU 50.

The shifting operation detection sensor SE6 detects the operation direction of the shift pedal 112 (FIG. 1) by the driver while feeding a signal representing the detected operation direction (a signal representing up-shifting or a signal representing down-shifting) to the ECU 50. The shifting operation detection sensor SE6 preferably includes a potentiometer, a load sensor, or a magnetostrictive sensor, for example. Note that the shifting operation detection sensor SE6 outputs a signal having a positive value when an up-shifting operation is detected, while outputting a signal having a negative value when a down-shifting operation is detected, for example.

The ECU 50 includes an interface circuit 51, a CPU (Central Processing Unit) 52, a ROM (Read Only Memory) 53, and a RAM (Random Access Memory) 54.

Respective output signals of the sensors SE1 to SE6 are fed to the CPU 52 through the interface circuit 51. The CPU 52 adjusts an output of the engine 107 based on results of detection by each of the sensors SE1 to SE6, as described later. The ROM 53 stores a control program by the CPU 52, for example. The RAM 54 functions as a work area for the CPU 52 while storing various data.

The shift actuator 7 is of an electric or hydraulic type, for example, and rotates the shift cam 6a (FIG. 2) under control of the CPU 52. The throttle actuator 8 includes an electric motor, for example, and adjusts the opening of the throttle valve 81 (FIG. 1) under control of the CPU 52. The fuel injection device 9 is provided for each cylinder in the engine 107. The ignition plug 10 is provided for each cylinder in the engine 107.

(4) Control Operations of CPU

Control operations of the CPU 52 at the time of normal driving of the motorcycle 100 and at the time of a shift change of the transmission 5 will be described below.

(a) Engine Output Control at Time of Normal Driving

At the time of normal driving of the motorcycle 100, the CPU 52 controls the throttle actuator 8, the fuel injection devices 9, and the ignition plugs 10 based on the accelerator opening detected by the accelerator opening sensor SE1. This causes the throttle opening, the fuel injection amount, and the ignition timing of an air-fuel mixture to be adjusted, resulting in the adjustment of the output of the engine 107. Note that the relationship between the accelerator opening and the throttle opening is previously stored in the ROM 53 (or the RAM 54) in the ECU 50.

Furthermore, the CPU 52 carries out feedback control of the throttle actuator 8 based on the throttle opening detected by the throttle sensor SE4. Thus, the throttle opening can be adjusted more properly.

(b) Engine Output Control at Time of Shift Change

The adjustment of the output of the engine 107 by the CPU 52 in a case where the driver operates the shift pedal 112 to perform the shift change will be then described.

Figure 4:
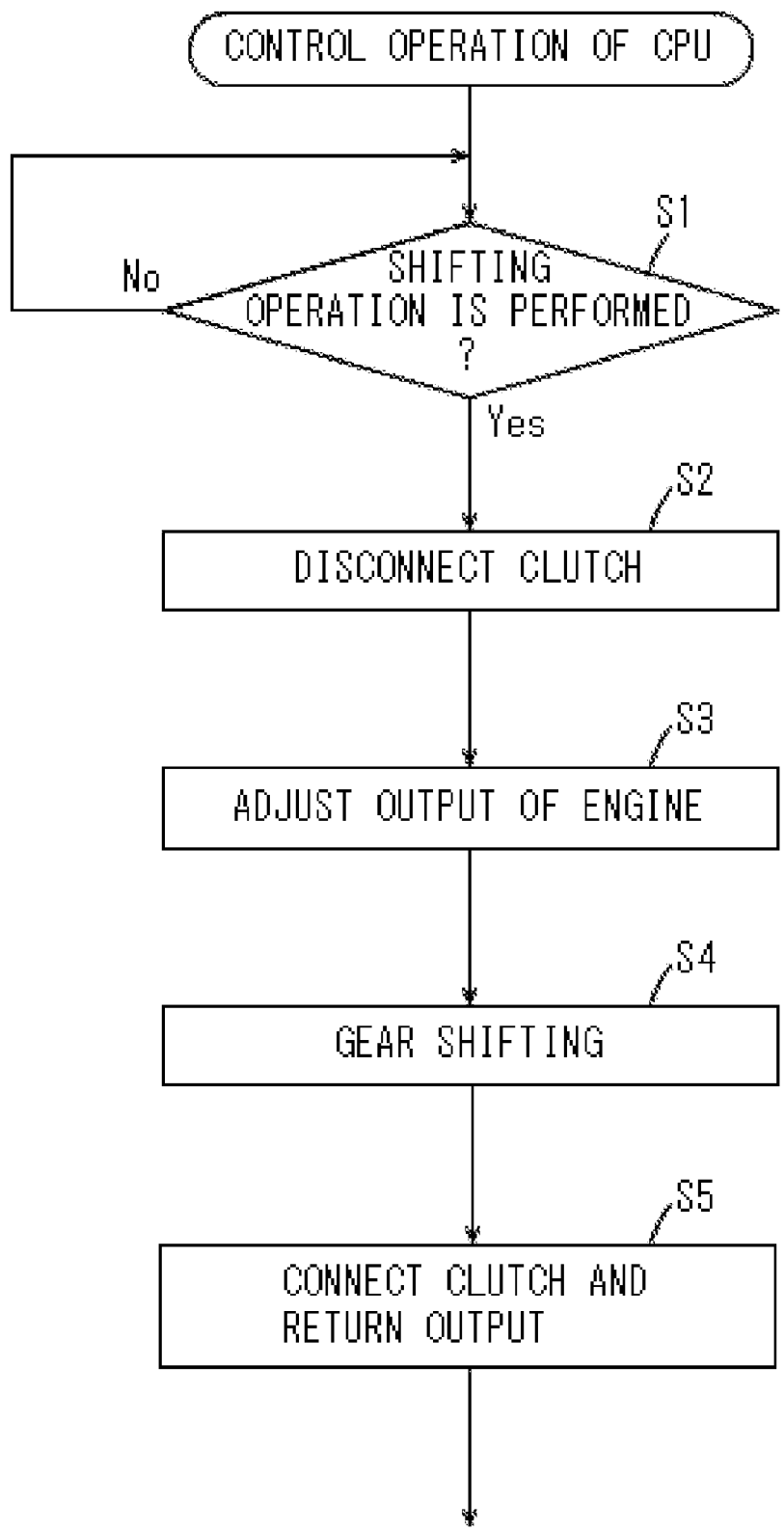
FIG. 4 is a flowchart showing an example of a control operation of a CPU.

FIG. 4 is a flowchart showing an example of the control operation of the CPU 52 at the time of the shift change.

As shown in FIG. 4, the CPU 52 first determines whether or not the driver performs a shifting operation based on an output signal of the shifting operation detection sensor SE6 (FIG. 3) (Step S1). When the driver does not perform the shifting operation, the ECU 50 waits until the shifting operation is performed.

When the driver performs the shifting operation, the CPU 52 controls the clutch actuator 4 (FIG. 2) to disconnect the clutch 3 (FIG. 2) (Step S2).

The CPU 52 then increases or decreases a torque (an output) of the engine 107 by controlling the throttle actuator 8, the fuel injection devices 9, or the ignition plugs 10 (Step S3). Specifically, when the driver performs a down-shifting operation while the motorcycle 100 is being decelerated, for example, the CPU 52 temporarily makes the throttle opening larger than a value determined based on the accelerator opening. This causes a torque generated in the engine 107 to temporarily increase. On the other hand, when the driver performs the up-shifting operation while the motorcycle 100 is being accelerated, for example, the CPU 52 temporarily stops the fuel injection devices 9 and the ignition plugs 10 while reducing the throttle opening to zero. This causes the torque generated in the engine 107 to temporarily reach zero.

Note that when the clutch 3 is connected in Step S5, described later, by the process of Step S3, a rotation speed of the main shaft 5a (the friction disks 3c (FIG. 2)) and a rotation speed of the clutch disks 3b (FIG. 2) can be easily brought closer to each other. This can prevent a transmission shock from occurring in the motorcycle 100.

The CPU 52 then performs gear shifting of the transmission 5 (Step S4). Specifically, the CPU 52 controls the shift actuator 7 (FIG. 3) to rotate the shift cam 6a (FIG. 2). This causes the shift forks 6c (FIG. 2) to move, causing the transmission gear 5c (FIG. 2) or the transmission gear 5d (FIG. 2) to move. As a result, the gear position of the transmission 5 is changed.

Thereafter, the CPU 52 controls the clutch actuator 4, to connect the clutch 3 while returning the output of the engine 107 to an output before the shifting operation (Step S5). This results in termination of the shift change of the transmission 5.

(c) Control Operation at Time of Up-Shifting (c-1) Outline of Up-Shifting Control When the transmission 5 is shifted up, a reduction gear ratio between the main shaft 5*a* (FIG. 2) and the drive shaft 5*b* (FIG. 2) decreases, so that the rotation speed of the main shaft 5*a* (the friction disks 3*c* (FIG. 2)) decreases. When the transmission 5 is shifted up, therefore, the rotation speed of the engine 107 maybe reduced. In this case, a difference in rotation speed between the clutch disks 3*b* and the friction disks 3*c* can be reduced. This can prevent the transmission shock from occurring in the motorcycle 100 when the clutch 3 is connected.

In the present preferred embodiment, when up-shifting control of the transmission 5 is carried out, therefore, the torque generated in the engine 107 is temporarily decreased while the rotation speed of the engine 107 is reduced with the clutch 3 brought into a half-clutched state.

Note that in the present preferred embodiment, when the driver performs the up-shifting operation, the CPU 52 calculates an appropriate rotation speed (hereinafter referred to as a target rotation speed) of the engine 107 corresponding to a gear position after the up-shifting based on the following equation (1). An engagement torque (a friction torque) of the clutch 3 is adjusted such that the rotation speed of the engine 107 is reduced to the target rotation speed. The target rotation speed is a rotation speed of the engine 107 at which the rotation speed of the drive shaft 5*b* (FIG. 2) (a vehicle body speed) before the up-shifting can be maintained when the clutch 3 is connected in a gear position after the up-shifting:

$$S2 = S1 \times (R2/R1) \quad (1)$$

In the fore going equation (1), S1 denotes a rotation speed of the engine 107 before the up-shifting of the transmission 5, S2 denotes a target rotation speed, R1 denotes a reduction gear ratio of the transmission 5 before the gear shifting, and R2 denotes a reduction gear ratio of the transmission 5 after the gear shifting.

The up-shifting control of the transmission 5 by the CPU 52 will be described by way of an example. Description is now made of a case where the gear position of the transmission 5 is shifted up when the motorcycle 100 is being driven at a substantially constant speed.

Figure 5:
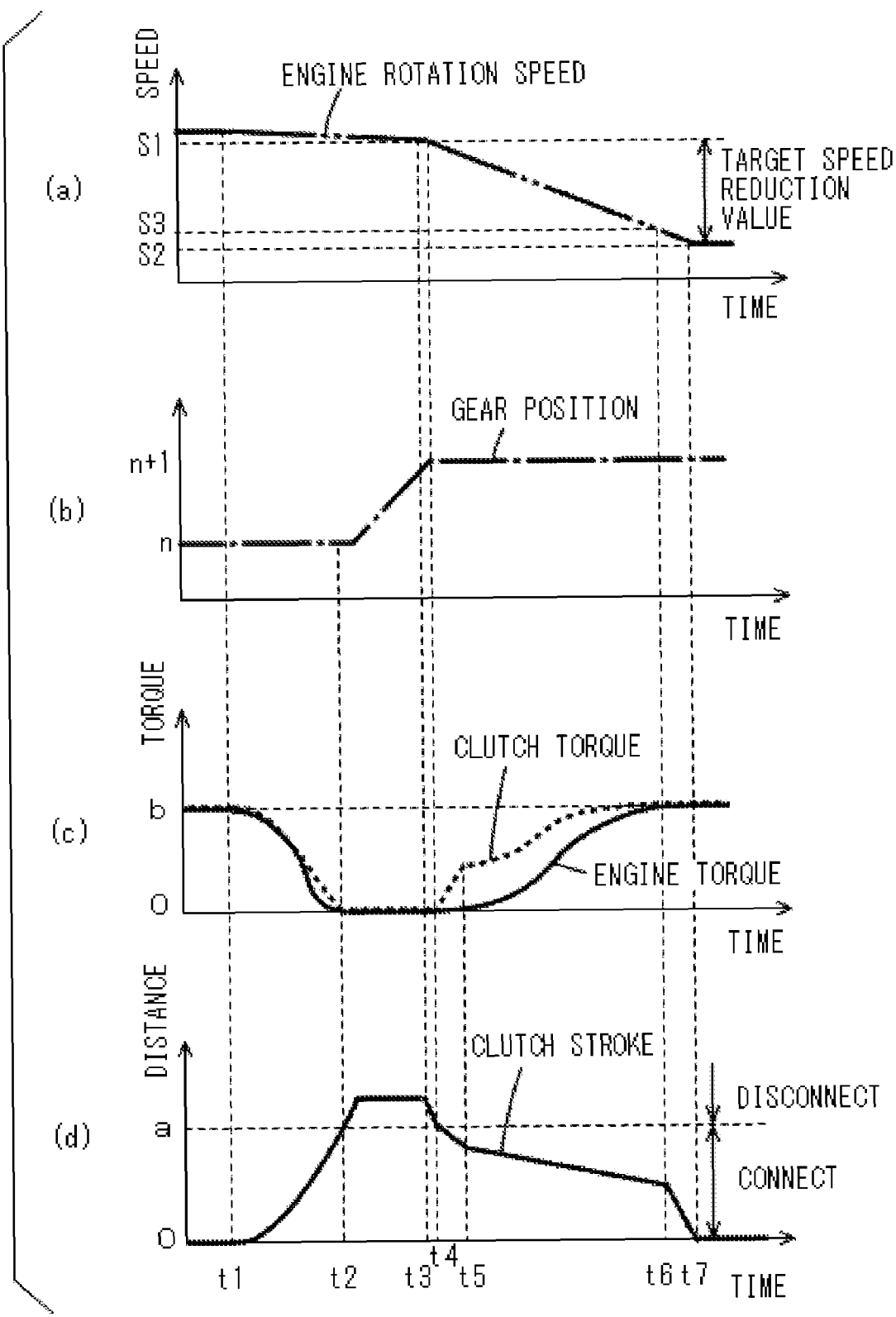
FIG. 5 is a diagram for describing up-shifting control.

FIG. 5 is a diagram for describing the up-shifting control of the transmission 5 by the CPU 52, where portion (a) of FIG. 5 is a graph showing a change with time in the rotation speed of the engine 107, portion (b) of FIG. 5 is a graph showing a change with time in the gear position of the transmission 5, portion (c) of FIG. 5 is a graph showing a change with time in a torque generated in the engine 107 (hereinafter referred to as an engine torque) and a change with time in an engagement torque of the clutch 3 (hereinafter referred to as a clutch torque), and portion (d) of FIG. 5 is a graph showing a change with time in a movement amount of the push rod 5*e* (FIG. 2) (hereinafter referred to as a clutch stroke).

Note that in the graph of portion (d) of FIG. 5, the clutch 3 is connected (including a half-clutched state) when the clutch stroke is not more than a value a, while being disconnected when the clutch stroke is more than the value a.

As shown in portion (d) of FIG. 5, in the present preferred embodiment, the clutch stroke is increased after the driver performs the up-shifting operation at a time point t1. Thus, the clutch 3 is disconnected so that the clutch torque reaches zero at a time point t2, as shown in portions (c) and (d) of FIG. 5. As shown in portion (c) of FIG. 5, the engine torque is reduced to zero after the time point t1.

As shown in portion (b) of FIG. 5, the gear position of the transmission 5 is then shifted up by one stage after the time point t2 where the clutch 3 is disconnected. Note that in portion (b) of FIG. 5, coupling between the transmission gear 5*c* (FIG. 2) and the transmission gear 5*d* (FIG. 2) (contact of dogs) is started at a time point t3. Therefore, the rotation speed of the main shaft 5*a* (FIG. 2) is reduced at the time point t3.

As shown in portions (c) and (d) of FIG. 5, the clutch stroke is then decreased at the time point t3 where the coupling between the transmission gears 5*c* and 5*d* is started. This causes the clutch 3 to enter a half-clutched state at a time point t4, causing the clutch torque to increase. As a result, the rotation speed of the clutch disks 3*b* (FIG. 2) decreases. That is, the rotation speed of the engine 107 decreases.

As shown in portions (a) and (d) of FIG. 5, the reduction speed of the clutch stroke, i.e., the connection speed of the clutch 3 is then increased at a time point t6 where the rotation speed of the engine 107 is reduced to a threshold value S3. At a time point t7, the clutch 3 is completely connected. The threshold value S3 is set to a speed higher by 50 rpm than the target rotation speed S2, for example.

As shown in portions (c) and (d) of FIG. 5, a return operation of the engine torque is started at the time point t4 where the clutch 3 enters a half-clutched state. Specifically, the engine torque is increased so as to return to a torque value b (a value of the engine torque at the time point t1 where the up-shifting operation is performed) at the time point t7 where the connection operation of the clutch 3 is terminated. In this case, the engine torque can be returned in parallel with the connection operation of the clutch 3. Therefore, a period of time required to return the engine torque can be shortened. This enables smooth up-shifting of the transmission 5. Since the engine torque is returned when the clutch 3 is connected, the motorcycle 100 can be quickly accelerated after the clutch 3 is connected. This results in improvement in a driving feeling of the motorcycle 100.

Note that a period of time from the time point t4 to the time point t7 (a torque return period) is determined based on a difference between a rotation speed S1 of the engine 107 (portion (a) in FIG. 5) at the time point t3 where the coupling between the transmission gears 5*c* and 5*d* is started and the target rotation speed S2 calculated based on the foregoing equation (1) (hereinafter referred to as a target speed reduction value), for example.

Specifically, a map representing the relationship between the target speed reduction value and the period of time between the time points t4 and t7 is previously stored in the ROM 53 (or the RAM 54) in the ECU 50 (FIG. 3), for example. The CPU 52 calculates the target speed reduction value at the time point t3 while determining the period of time between the time points t4 and t7 from the map stored in the ROM 53 (or the RAM 54) based on the target speed reduction value. Note that the period of time between the time points t4 and t7 is set so as to increase as the target speed reduction value increases, for example. Thus, the rotation speed of the engine 107 can be smoothly reduced.

In the present preferred embodiment, the CPU 52 sets a target engine torque value and a target clutch torque value between the time points t4 and t7 when the driver performs the up-shifting operation. The CPU 52 controls constituent elements such that the engine torque and the clutch torque increase according to the target engine torque value and the target clutch torque value.

A method of setting the target engine torque value and the target clutch torque value between the time points t4 and t7 will be described in detail below.

Figure 6:
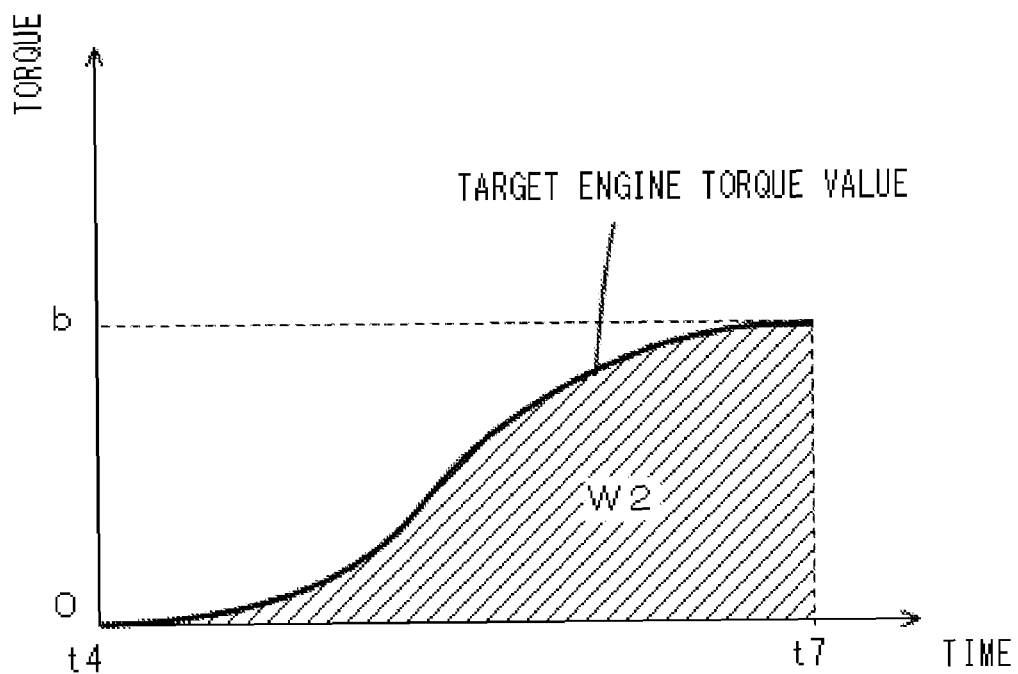
FIG. 6 is a flowchart showing an example of a target engine torque value.

First, the target engine torque value will be described. FIG. 6 is a diagram showing an example of the target engine torque value.

As shown in FIG. 6, in the present preferred embodiment, the target engine torque value is set as a value that increases so as to define a sine waveform between the time points t4 and t7. Here, the period of time between the time points t4 and t7 is determined based on the target speed reduction value (portion (a) in FIG. 5) calculated when the driver performs the up-shifting operation, as described above. Therefore, the CPU 52 first determines the period of time between the time points t4 and t7 when the driver performs the up-shifting operation. The target engine torque value is set such that the engine torque increases so as to draw a sine waveform from zero to the value b (portion (c) in FIG. 5) in the determined period of time between the time points t4 and t7.

In this case, the engine torque can be gently increased. This makes it easy to control each of the constituent elements, and can further prevent a shock based on a torque variation from occurring in the motorcycle 100. This results in improvement in the driving feeling of the motorcycle 100.

The target clutch torque value will be then described.

As described in the foregoing, in the present preferred embodiment, the clutch torque is adjusted such that the rotation speed of the engine 107 decreases from the rotation speed S1 (portion (a) in FIG. 5) to the target rotation speed S2 (portion (a) in FIG. 5) between the time points t4 and t7.

Here, a work load (an amount of energy) W1 required to reduce the rotation speed of the engine 107 from the rotation speed S1 to the target rotation speed S2 when no load is applied to the engine 107 (when the clutch 3 is disconnected) is calculated by the following equation (2):

$$W1 = I \times (S1 - S2) \quad (2)$$

In the foregoing equation (2), I denotes a moment of inertia of a rotor that is rotated by the engine 107 when the clutch 3 is disconnected, which is previously set based on an experiment or a simulation. The moment of inertia I is calculated by adding the moments of inertia of a plurality of torque transmitting members (including the crank 2 (FIG. 2) and the clutch disks 3b (FIG. 2)) between the crank 2 and the clutch disks 3b, for example.

In the present preferred embodiment, the engine torque is increased from zero to the value b between the time points t4 and t7. A work load W2 of the engine 107 between the time points t4 and t7 is represented by the product of the engine torque and a period of time therebetween, and is equal to the area of a region indicated by oblique hatching in FIG. 6.

In order to reduce the rotation speed of the engine 107 to the target rotation speed S2 in the present preferred embodiment, therefore, an amount of energy equal to the sum of the work load W1 calculated based on the foregoing equation (2) and the work load W2 of the engine 107 between the time points t4 and t7 must be consumed in the clutch 3.

Here, the energy consumed in the clutch 3 is equal to the product of the clutch torque and a period of time. Therefore, an amount of energy equal to the work load W2 of the engine 107 can be consumed by generating a clutch torque having a value equal to the target engine torque value between the time points t4 and t7 (hereinafter referred to as an equivalent engine torque).

Therefore, in the present preferred embodiment, a value obtained by further adding a clutch torque required to consume the work load W1 calculated based on the foregoing equation (2) (hereinafter referred to as an addition torque) to the equivalent engine torque shall be the target clutch torque value.

Figure 7:
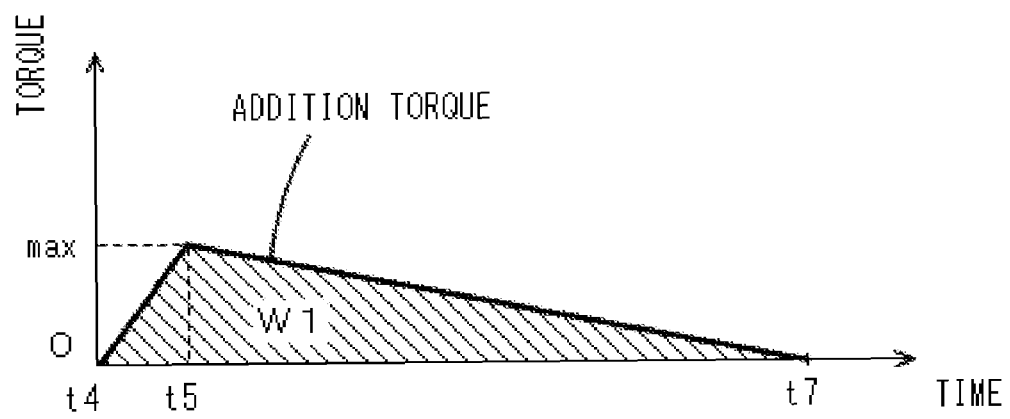
FIG. 7 is a diagram showing an example of a change with time in an addition torque.

FIG. 7 is a diagram showing an example of a change with time in the addition torque (the clutch torque required to consume the work load W1). As shown in FIG. 7, in the present preferred embodiment, the addition torque is set to linearly increase from zero to a maximum value between the time point t4 and t5 while linearly decreasing between the time points t5 and t7. A rate of change per unit time of the addition torque between the time points t4 and t5 is set higher than a rate of change per unit time of the addition torque between the time points t5 and t7. Note that the period of time between the time points t4 and t5 may be set to about 15% to about 30%, for example, of the period of time between the time points t4 and t7.

Figure 8:
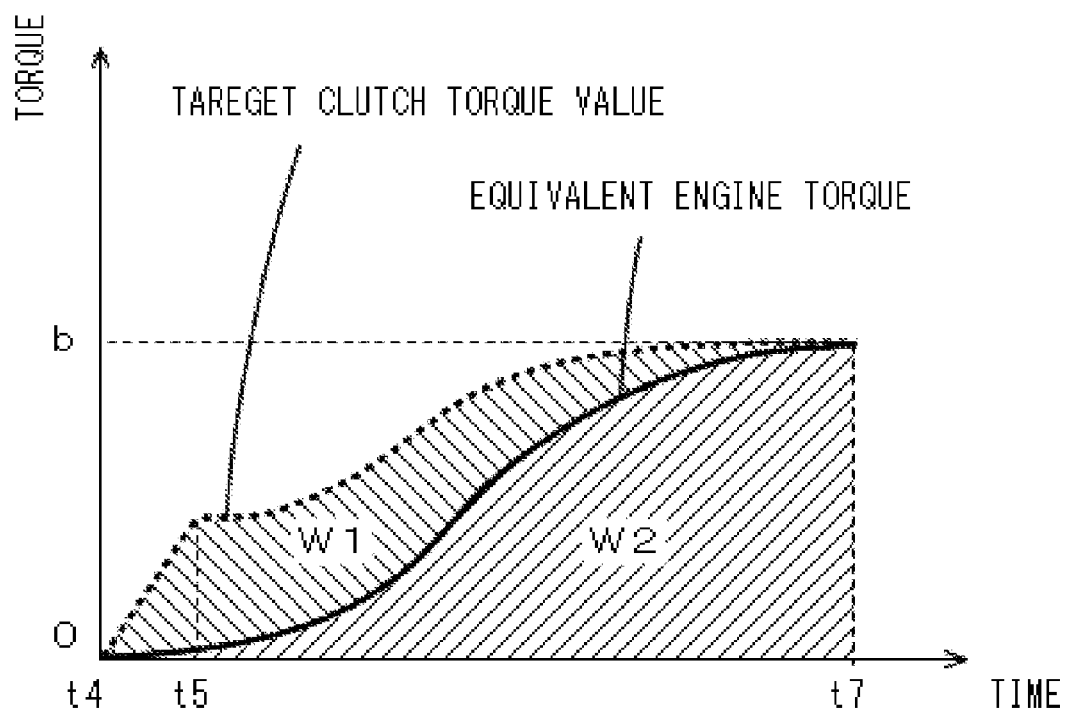
FIG. 8 is a diagram showing a change with time in a target clutch torque value.

FIG. 8 is a diagram showing a change with time in the target clutch torque value calculated by adding the addition torque shown in FIG. 7 to the equivalent engine torque. In FIG. 8, the solid line indicates the equivalent engine torque, and a dotted line indicates the change with time in the target clutch torque value.

As described in FIG. 7, in the present preferred embodiment, the addition torque increases at a high rate of change between the time points t4 and t5. Therefore, the target clutch torque value increases at a high rate of change between the time points t4 and t5, as shown in FIG. 8. In this case, a rate of increase in the clutch torque between the time points t4 and t5 can be increased. This enables the driver to have an acceleration feeling. Thus, a period of time in which the driver has an idling feeling is shortened. This results in improvement in the driving feeling of the motorcycle 100.

As described in FIG. 7, the addition torque gently or gradually decreases between the time points t5 and t7. Therefore, the target clutch torque value gently increases between the time points t5 and t7, as shown in FIG. 8. In this case, the clutch torque can be gently increased. This can prevent the shock based on the variation in the clutch torque from occurring in the motorcycle 100.

Furthermore, the value of the clutch torque can be gradually brought closer to the value of the engine torque. This can prevent the shock from occurring in the motorcycle 100 when the clutch 3 is connected.

In the present preferred embodiment, the addition torque is set such that an amount of energy equal to the work load W1 is consumed in the clutch 3 at the time point t7 where the return of the engine torque is completed. In this case, the rotation speed of the engine 107 can be reliably reduced to the target rotation speed S2 at the time point t7 where the return of the engine torque is completed. This enables smooth up-shifting of the transmission 5.

(c-2) Control Flow

A control operation of the CPU 52 at the time of the up-shifting control will be then described.

Figure 9:
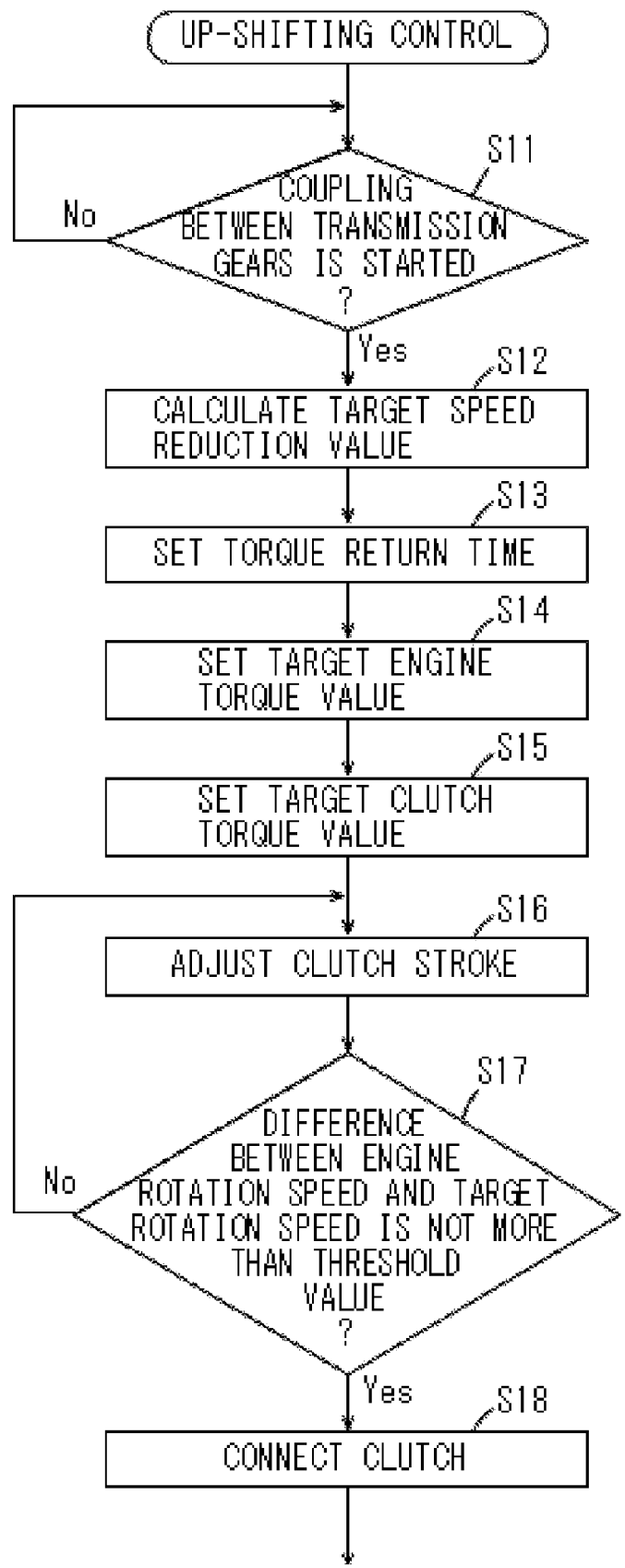
FIG. 9 is a flowchart showing an example of a control operation of a CPU.

FIG. 9 is a flowchart showing an example of the control operation of the CPU 52 at the time of the up-shifting control.

As shown in FIG. 9, in the up-shifting control, the CPU 52 first determines whether or not the coupling between the transmission gears 5c and 5d is started (at the time point t3 in FIG. 5) based on the detected value of the shift cam rotation angle sensor SE4 (FIG. 3) (Step S11). When the coupling between the transmission gears 5c and 5d is not started, the CPU 52 waits until the coupling between the transmission gears 5c and 5d is started.

When the coupling between the transmission gears 5c and 5d is started, the CPU 52 calculates a target speed reduction value (FIG. 5) based on the detected values of the engine rotation speed sensor SE3 and the shift cam rotation angle sensor SE4 (Step S12).

The CPU 52 then sets the torque return period (the period of time between the time points t4 and t7 in FIG. 6) based on the target speed reduction value calculated in Step S12 (Step S13). The CPU 52 then sets the target engine torque value based on the torque return period set in Step S13 (Step S14).

The CPU 52 then sets the target clutch torque value based on the target speed reduction value calculated in Step S12, the torque return period calculated in Step S13, and the target engine torque value set in Step S14 (Step S15).

The CPU 52 then adjusts the clutch stroke by controlling the clutch actuator 4 (FIG. 3) such that the clutch torque increases according to the target clutch torque value set in Step S15 (Step S16).

Note that in the present preferred embodiment, a map representing the relationship between the clutch stroke and the clutch torque is previously stored in the ROM 53 (or the RAM 54) in the ECU 50. In Step S16, the CPU 52 adjusts the clutch stroke based on the target clutch torque value and the map stored in the ROM 53 (or the RAM 54). That is, in the present preferred embodiment, the clutch stroke is adjusted by feedforward control.

The CPU 52 then determines whether or not the difference between the rotation speed of the engine 107 and the target rotation speed S2 is not more than a threshold value (e.g., 50 rpm) based on the detected value of the engine rotation speed sensor SE3 (Step S17). When the difference between the rotation speed of the engine 107 and the target rotation speed S2 is more than the threshold value, the CPU 52 continues to adjust the clutch stroke.

When the difference between the rotation speed of the engine 107 and the target rotation speed S2 is not more than the threshold value, the CPU 52 completely connects the clutch 3 (Step S18). This results in termination of the up-shifting control of the CPU 52. Note that the clutch 3 can be connected with the difference in rotation speed between the clutch disks 3b (FIG. 2) and the friction disks 3c (FIG. 2) sufficiently reduced by providing the process of Step S18. This can reliably prevent a shock based on the connection operation of the clutch 3 from occurring in the motorcycle 100.

(5) Effects and Advantages of Present Preferred Embodiment

In the present preferred embodiment, when the coupling between the transmission gears 5c and 5d is started in the up-shifting control, a torque higher than the torque of the engine 107 (the engine torque) is generated in the clutch 3. This enables a sufficiently high torque to be applied to the main shaft 5a before the return operation of the engine torque is completed. Therefore, the period of time in which the driver has an idling feeling can be shortened. This results in improvement in the driving feeling of the motorcycle 100.

The engine torque can be returned in parallel with the connection operation of the clutch 3. Therefore, the period of time required to return the engine torque can be shortened. This enables smooth up-shifting of the transmission 5.

In the present preferred embodiment, the work load W1 required to reduce the rotation speed of the engine 107 to the target rotation speed S2 is consumed in the clutch 3 in the period of time required to return the engine torque. In this case, the rotation speed of the engine 107 can be reliably reduced to the target rotation speed S2 when the engine torque is returned. This can prevent the period of time required to reduce the rotation speed of the engine 107 to the target rotation speed S2 from being increased. This can result in quick up-shifting of the transmission 5.

(6) Another Preferred Embodiment (6-1) Other Examples of Addition Torque, Target Clutch Torque Value, and Target Engine Torque Value The addition torque and the target clutch torque value are not limited to the examples described in FIGS. 7 and 8.

Figure 10A:
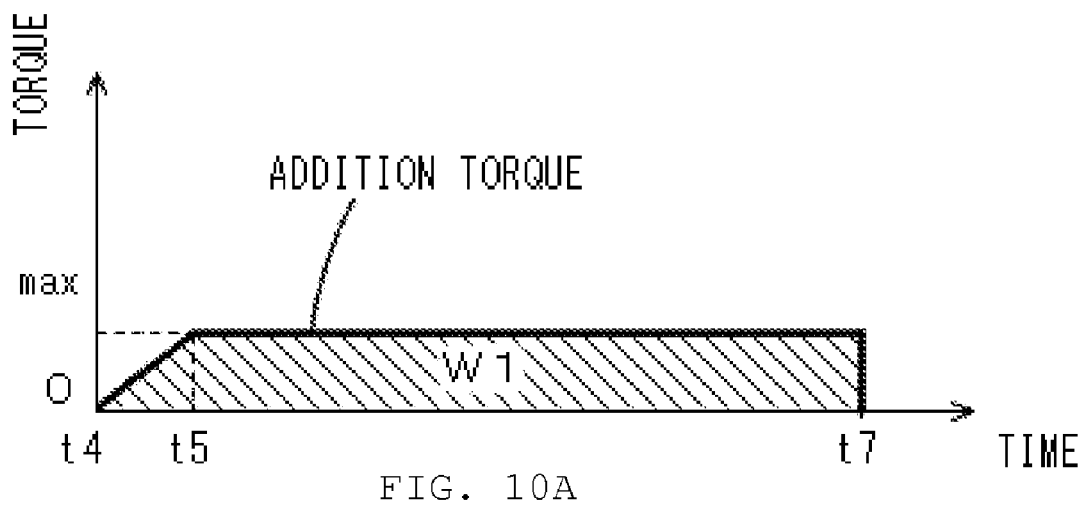
FIGS. 10A and 10B are diagrams showing other examples of an addition torque and a target clutch torque value.
Figure 10B:
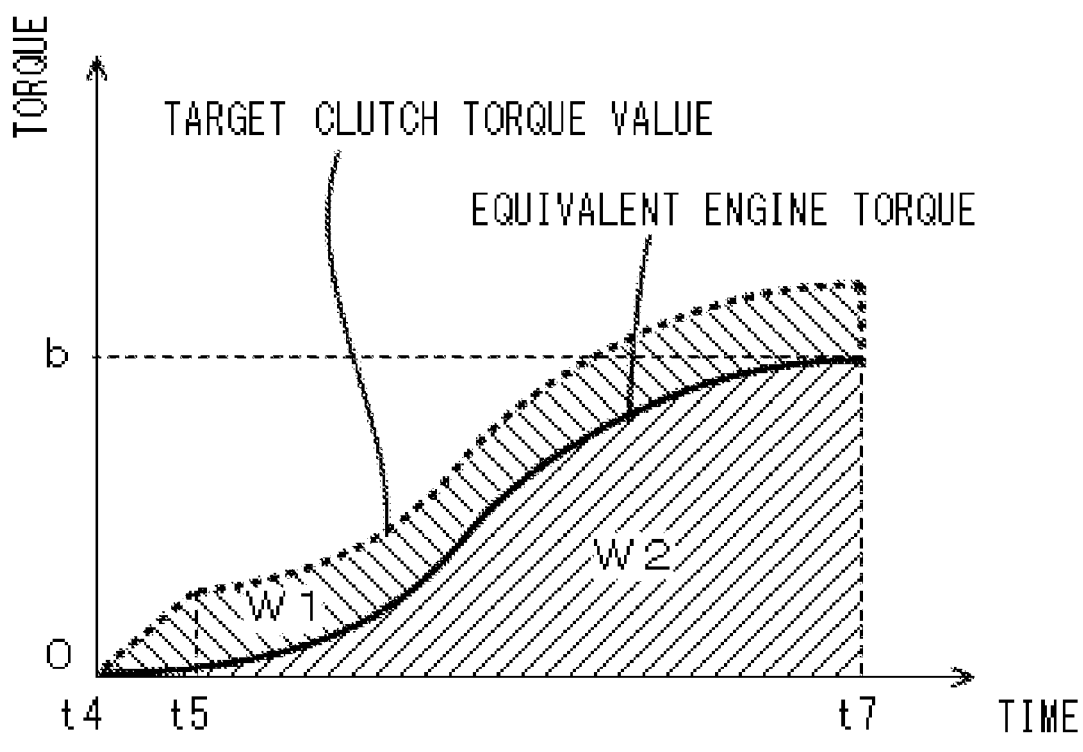

FIGS. 10A and 10B are diagrams showing other examples of the addition torque and the target clutch torque value, where FIG. 10A shows a change with time in the addition torque, and FIG. 10B shows the other example of the target clutch torque value. In FIG. 10B, a solid line indicates an equivalent engine torque, and a dotted line indicates the target clutch torque value.

In the example shown in FIG. 1A, the value of the addition torque is kept constant between time points t5 and t7. In this case, as shown in FIG. 10B, a change with time in the target clutch torque value represents a waveform in a shape similar to that of the equivalent engine torque between the time points t5 and t7. In this case, a clutch torque can be gently increased between the time points t5 and t7. This can sufficiently prevent a shock based on a variation in the clutch torque from occurring in the motorcycle 100.

Although the target engine torque value is set as a value that increases so as to draw a sine waveform in the above-mentioned preferred embodiment, the target engine torque value may be set as a value that increases so as to draw another non-linear waveform or liner waveform.

(6-2) Another Example of Method of Adjusting Clutch Stroke

Although the CPU 52 adjusts the clutch stroke by the feedforward control based on the map stored in the ROM 53 (or the RAM 54) in the above-mentioned preferred embodiment, the method of adjusting the clutch stroke is not limited to the foregoing example.

For example, the clutch actuator 4 may be subjected to feedback control such that the motorcycle 100 is provided with a torque sensor to detect a clutch torque and the clutch torque detected by the torque sensor comes closer to a target clutch torque value.

For example, the clutch actuator 4 may be subjected to feedback control such that a clutch torque is calculated based on an amount of change in a rotation speed of the engine 107 detected by the engine rotation speed sensor SE3 and the calculated clutch torque comes closer to a target clutch torque value.

For example, the clutch actuator 4 may be subjected to feedforward control based on a previously set control value in a period of time elapsed until the connection of the clutch 3 is started (e.g., between the time points t3 and t4 in FIG. 5), while being subjected to feedback control based on a clutch torque detected or calculated in the foregoing manner within a period of time that has elapsed since the connection of the clutch 3 was started (e.g., between the time points t5 to t6 in FIG. 5).

For example, the clutch actuator 4 may be subjected to feedback control such that a clutch torque is calculated based on an amount of change in a rotation speed of the motorcycle 100 calculated based on the detected value of the drive shaft rotation speed sensor SE5 and the calculated clutch torque comes closer to a target clutch torque value.

For example, the clutch actuator 4 may be subjected to feed-forward control in a period of time in which a rate of change in an addition torque is high (e.g., between the time points t4 and t5 in FIGS. 7 and 10), while being subjected to feedback control in a period of time in which the rate of change in the addition torque is low (e.g., between the time points t5 to t7 in FIGS. 7 and 10A and 10B).

For example, the clutch actuator 4 may be subjected to feed-forward control in a period of time in which the clutch disks 3b (FIG. 2) and the friction disks 3c (FIG. 2) do not come into contact with each other (e.g., between the time points t3 and t4 in FIG. 5), while being subjected to feedback control in a period of time in which the clutch disks 3b and the friction disks 3c come into contact with each other (e.g., between the time points t4 to t6 in FIG. 5).

Although the clutch 3 is completely connected when the difference between the rotation speed detected by the engine rotation speed sensor SE3 and the target rotation speed S2 calculated by the CPU 52 is not more than the threshold value in the above-mentioned preferred embodiment, the timing at which the clutch 3 is completely connected is not limited to the foregoing example.

For example, the clutch 3 may be completely connected when a difference in rotation speed between the clutch disks 3b (FIG. 2) and the friction disks 3c (FIG. 2) is not more than a threshold value. Note that a rotation speed of the clutch disks 3b is calculated based on a rotation speed of the engine 107 detected by the engine rotation speed sensor SE3 and a primary reduction gear ratio between the crank 2 and the clutch 3, and a rotation speed of the friction disks 3c is calculated based on a rotation speed of the drive shaft 5b detected by the drive shaft rotation speed sensor SE5 and a reduction gear ratio of the transmission 5.

For example, the clutch stroke maybe adjusted according to a target clutch torque value until a time point where a period of time in which an engine torque is returned (e.g., between the time points t4 to t7 in FIG. 5; which is abbreviated as a torque return period) is terminated, and the clutch 3 may be completely connected after the torque return period is terminated.

(6-3) Another Example of Torque Return Period

Although the CPU 52 determines the length of the torque return period (between the time points t4 to t7 in FIG. 5) based on the target speed reduction value (FIG. 5) in the above-mentioned preferred embodiment, the method of determining the torque return period is not limited to the foregoing example.

For example, the length of the torque return period may be determined based on the gear position of the transmission 5. Alternatively, the length of the torque return period may be determined based on the gear position of the transmission 5 and an engine torque at the start of an up-shifting operation (e.g., the time point t3 in FIG. 5).

Furthermore, the torque return period may have a previously set length, for example.

(6-4) Another Configuration

Although the multiple disk clutch 3 is provided in the above-mentioned preferred embodiment, a clutch 3 having another structure may be provided. For example, a single disk clutch may be used as the clutch 3.

Although the motorcycle 100 has been described as an example of the vehicle in the above-mentioned preferred embodiment, the vehicle may be other vehicles such as three-wheeled motor vehicles and four-wheeled motor vehicles.

Although in the preferred embodiment, the semi-automatic transmission control system 200 that automatically performs the shift change of the transmission 5 based on the shifting operation by the driver has been described, the present invention is also applicable to a fully-automatic transmission control system.

(7) Examples of Correspondences Between Claim Elements and Elements in Description of Preferred Embodiments In the following two paragraphs, non-limiting examples of correspondences between various elements recited in the claims below and those described above with respect to various preferred embodiments of the present invention are explained.

In the preferred embodiments described above, the throttle actuator 8, the fuel injection device 9, and the ignition plug 10 are examples of an engine torque adjuster, the clutch actuator 4 is an example of a clutch operating mechanism, the shifting mechanism 6 and the shift actuator 7 are examples of a shifting mechanism, the CPU 52 is an example of a controller, the work load W1 is an example of a first amount of energy, the torque return period (the period of time between the time points t4 to t7) is an example of a torque adjustment period, the target clutch torque value is an example of a target clutch engagement torque value, the work load W2 is an example of a third amount of energy, the period of time between the time points t4 and t5 is an example of a first period, the period of time between the time points t5 and t7 is an example of a second period, and the rear wheel 116 is an example of a drive wheel.

As each of various elements recited in the claims, various other elements having configurations or functions described in the claims may be also used.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A transmission control system for a vehicle including an engine, a clutch, and a transmission, comprising:
   an engine torque adjuster arranged to adjust an engine torque generated in the engine;
   a clutch operating mechanism arranged to disconnect and connect the clutch;
   a shifting mechanism arranged to shift a gear position of the transmission; and
   a controller arranged to control the engine torque adjuster, the clutch operating mechanism, and the shifting mechanism; wherein
   when the transmission is shifted up, the controller calculates a target rotation speed of the engine after the up-shifting of the transmission while calculating a first amount of energy required to reduce a rotation speed of the engine to the target rotation speed, causes the engine torque adjuster to decrease the engine torque while causing the clutch operating mechanism to disconnect the clutch, and causes the shifting mechanism to shift the gear position of the transmission with the clutch disconnected, and after the gear position is shifted, the controller causes the engine torque adjuster to increase the engine torque according to a target engine torque value set as a value that changes in a predetermined torque adjustment period while causing the clutch operating mechanism to connect the clutch such that an engagement torque of the clutch increases according to a target clutch engagement torque value set as a value that changes in the torque adjustment period; and
   in the torque adjustment period, the target clutch engagement torque value is set such that a difference between a second amount of energy generated in the clutch when the engagement torque of the clutch is generated according to the target clutch engagement torque value and a third amount of energy generated in the engine when the engine torque is generated according to the target engine torque value is substantially equal to the first amount of energy.

2. The transmission control system according to claim 1, wherein the target clutch engagement torque value changes at a value higher than the target engine torque value in a period of time that has elapsed after the start of the torque adjustment period before the end thereof.

3. The transmission control system according to claim 1, wherein the target engine torque value changes so as to increase to a value of the engine torque before the up-shifting of the transmission when the torque adjustment period is terminated.

4. The transmission control system according to claim 1, wherein the torque adjustment period is determined based on a difference between a rotation speed of the engine before the up-shifting of the transmission and the target rotation speed.

5. The transmission control system according to claim 1, wherein the torque adjustment period is determined based on the gear position of the transmission.

6. The transmission control system according to claim 1, wherein:
   the target engine torque value and the target clutch engagement torque value start to increase at a point in time when the torque adjustment period is started;
   the torque adjustment period includes a first period including a point in time when the increase is started and a second period longer than the first period; and
   the target clutch engagement torque value is set such that a difference between the target clutch engagement torque value and the target engine torque value increases with an elapse of time within the first period.

7. The transmission control system according to claim 6, wherein the target clutch engagement torque value is set such that the difference between the target clutch engagement torque value and the target engine torque value decreases with an elapse of time within the second period.

8. The transmission control system according to claim 6, wherein the target clutch engagement torque value is set such that the difference between the target clutch engagement torque value and the target engine torque value is substantially constant in the second period.

9. The transmission control system according to claim 1, wherein the controller is arranged to perform feed-forward control of the clutch operating mechanism according to a control value previously set until the engagement of the clutch is started, while carrying out feedback control of the clutch operating mechanism based on a rate of decrease in the rotation speed of the engine or the engagement torque of the engine after the engagement of the clutch is started.

10. A vehicle comprising:
   a drive wheel;
   an engine;
   a transmission arranged to transmit a torque generated by the engine to the drive wheel;
   a clutch provided between the engine and the transmission; and
   a transmission control system including:
      an engine torque adjuster arranged to adjust an engine torque generated in the engine;
      a clutch operating mechanism arranged to disconnect and connect the clutch;
      a shifting mechanism arranged to shift a gear position of the transmission; and
      a controller arranged to control the engine torque adjuster, the clutch operating mechanism, and the shifting mechanism; wherein
   when the transmission is shifted up, the controller calculates a target rotation speed of the engine after the up-shifting of the transmission while calculating a first amount of energy required to reduce a rotation speed of the engine to the target rotation speed, causes the engine torque adjuster to decrease the engine torque while causing the clutch operating mechanism to disconnect the clutch, and causes the shifting mechanism to shift the gear position of the transmission with the clutch disconnected, and after the gear position is shifted, the controller causes the engine torque adjuster to increase the engine torque according to a target engine torque value set as a value that changes in a predetermined torque adjustment period while causing the clutch operating mechanism to connect the clutch such that an engagement torque of the clutch increases according to a target clutch engagement torque value set as a value that changes in the torque adjustment period; and
   in the torque adjustment period, the target clutch engagement torque value is set such that a difference between a second amount of energy generated in the clutch when the engagement torque of the clutch is generated according to the target clutch engagement torque value and a third amount of energy generated in the engine when the engine torque is generated according to the target engine torque value is substantially equal to the first amount of energy.

* * * * *